United States Patent [19]

Harper et al.

[11] Patent Number: 4,750,137
[45] Date of Patent: Jun. 7, 1988

[54] SYSTEM FOR OPTIMIZING DATA TRANSMISSION ASSOCIATED WITH ADDRESSABLE-BUFFER DEVICES

[75] Inventors: Thomas A. Harper; Carol R. Harper, both of Sugarland, Tex.

[73] Assignee: BMC Software, Inc., Sugarland, Tex.

[21] Appl. No.: 827,767

[22] Filed: Feb. 7, 1986

[51] Int. Cl.⁴ .................. G06K 15/00; H04L 11/00
[52] U.S. Cl. .................................. 364/514; 340/345
[58] Field of Search ............ 364/514, 148, 518, 150; 340/345, 365 R

[56] References Cited

U.S. PATENT DOCUMENTS 4,587,633  5/1986  Wang et al. ................... 364/514
4,620,289  10/1986  Chauvel ........................ 364/514

FOREIGN PATENT DOCUMENTS 59-89056    5/1984  Japan .......................... 364/514
60-238976  11/1985  Japan .......................... 364/514
60-239143  11/1985  Japan .......................... 364/514

OTHER PUBLICATIONS

Nagel et al., "Programmable Communications Subsystem Having . . . ", from IBM Technical Disclosure Bulletin, vol. 21, No. 7, Dec. 1978, pp. 2633–2645.

Primary Examiner—Parshotam S. Lall
Assistant Examiner—Brian M. Mattson
Attorney, Agent, or Firm—Arnold, White & Durkee

[57] ABSTRACT

A method and a computer program for performing the method are disclosed for optimizing signals being exchanged between a host unit and an addressable-buffer peripheral device. The program optimizes an outgoing signal from the host unit by (1) creating an updated-state map representing the state of the peripheral device buffer expected to exist after processing by the peripheral device of the outgoing signal, (2) performing an exclusive-or (XOR) operation using the updated-state map and a present-state map representing the existing state of the buffer, and (3) constructing and transmitting a substitute outgoing signal which represents only changes to the buffer, and in which all premodified field flags are turned off. Position-dependent characters, such as attribute bytes, are translated into nondata characters prior to incorporation into a map, and are retranslated into their original form for use in the substitute signal.

13 Claims, 5 Drawing Sheets

| CONTENTS | N | O | W |   | I | S | N | O | T | T | I | M | E |
|---|---|---|---|---|---|---|---|---|---|---|---|---|---|
| ADDRESS | 1 | 2 | 3 | 4 | 5 | 6 | 7 | 8 | 9 | 10 | 11 | 12 | 13 |

| CONTENTS | Δ | N | O | W |   | ☐ | I | S |   | T | H | E | T | I | M | E |   |
|---|---|---|---|---|---|---|---|---|---|---|---|---|---|---|---|---|---|
| ADDRESS | 1 | 2 | 3 | 4 | 5 | 6 | 7 | 8 | 9 | 10 | 11 | 12 | 13 | 14 | 15 | 16 | 17 |

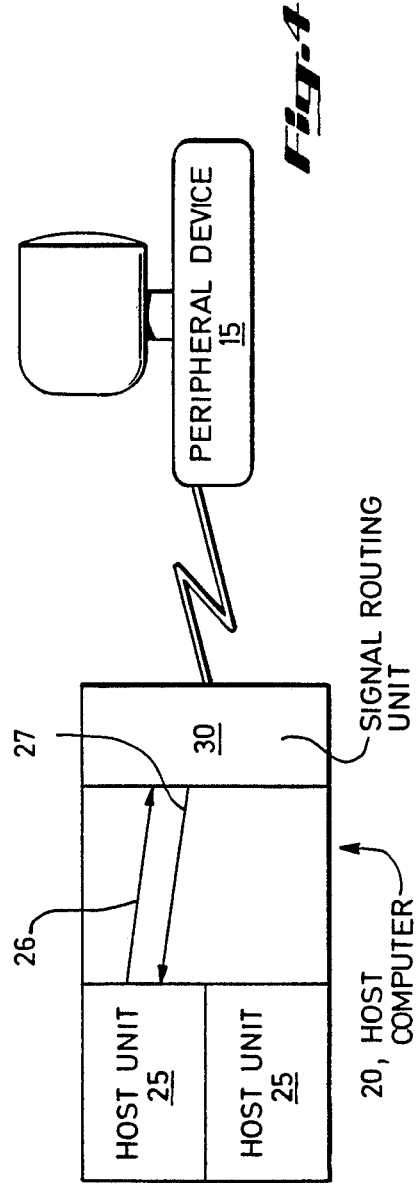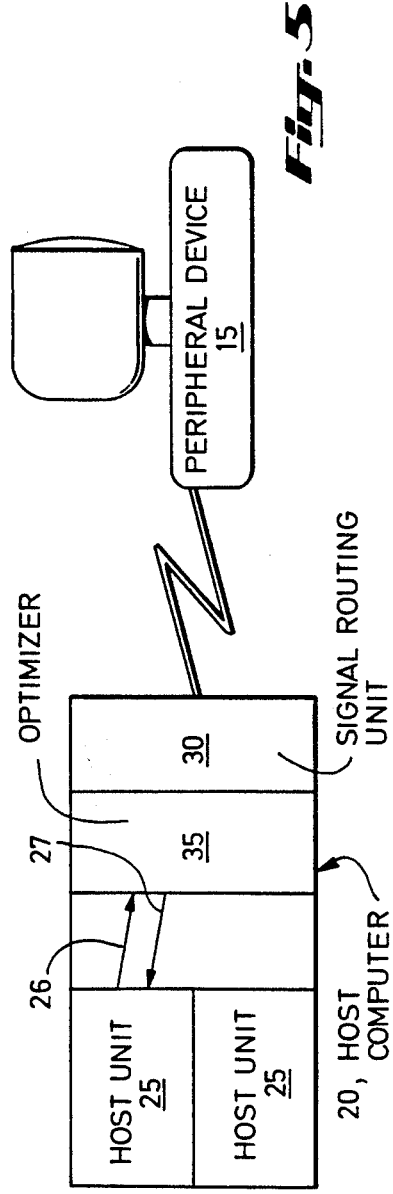

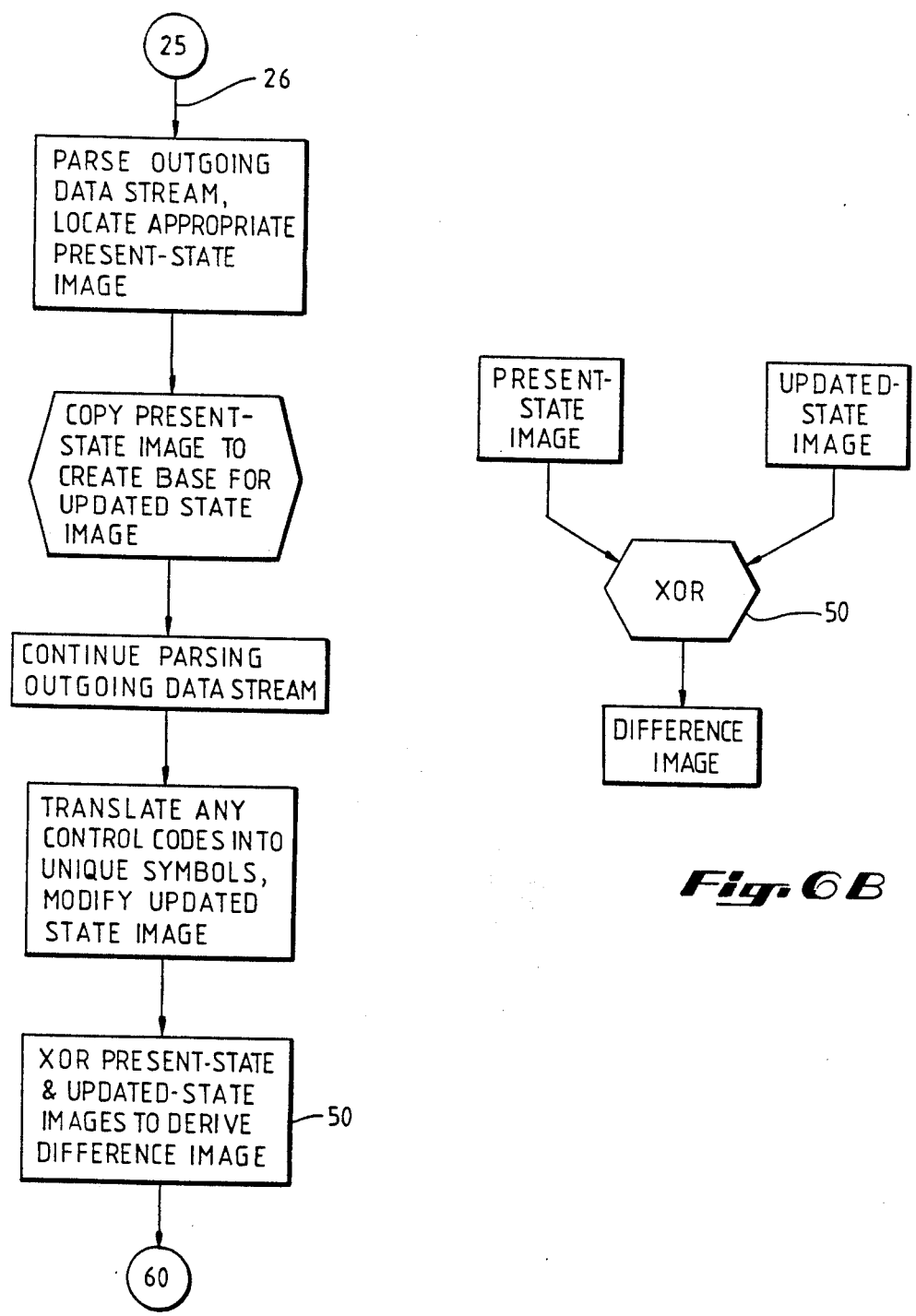

SYSTEM FOR OPTIMIZING DATA TRANSMISSION ASSOCIATED WITH ADDRESSABLE-BUFFER DEVICES

BACKGROUND OF THE INVENTION

The present invention relates to a system for optimizing the telecommunication of formatted data streams between a host computer, on the one hand, and a device that notes the data stream content in an addressable buffer, on the other. The device may be, for example, a screen-type display terminal, a printer, or other apparatus. The host and device may be in close physical proximity, as in the case of a local terminal at the site of the host, or they may be physically remote, as in the case of a dial-up terminal used to communicate with the host.

Addressable-Buffer Devices

In many on-line computer applications, end-users utilize terminal devices to view selected data and sometimes to enter or update the data. A travel agent in Los Angeles, for example, might use a remote terminal to send a data stream to an airline reservation host computer in Dallas requesting a display of all flights from Houston to New York. The host computer responds with a series of data streams containing the desired information.

A number of common terminal devices use an addressable buffer associated, e.g., with a screen display or a printer. Generally speaking, a "buffer" is an organized group of updatable electronic memory cells reserved for a particular use. A display or print buffer is typically a buffer that holds information displayed on a terminal screen or a hard-copy printout. It could be said that the screen or printer serves as a "viewer" for examining the contents of the device buffer in much the same way that a microfiche viewer can be used to examine back issues of newspapers stored on fiche.

FIG. 1 shows a greatly simplified representation of a typical device buffer arrangement. The host computer sends a data stream to the terminal device over a telecommunications line. The device, preprogrammed with its own internal software of a kind well known to those skilled in the art, updates the contents of the display buffer in response to data streams generated either by the host computer or by the terminal user (e.g., through a keyboard). The display shows the updated contents of the device buffer.

Communications Protocols

The effectiveness of a communication system such as that represented in FIG. 1 is commonly enhanced by programming the host computer and the terminal device to handle data streams in accordance with a prespecified convention. Such a convention is known as a "protocol." Protocols typically include specifications for treating some portions of a data stream as data and other portions as embedded commands.

The protocol used in U.S. long-distance telephone dialing is a familiar example. Any time the number "1" is received by the telephone company switching computer as the first digit in an initial dialing sequence, the computer automatically treats it as a command for a special call, e.g., to enter the long-distance network. The next three digits are then treated as the area code, and the final seven digits as the actual telephone number. Anyone wishing to place a long-distance call must observe this convention or a similar one, depending on which long-distance service is used.

A number of sophisticated data communications protocols operate in a basically similar manner. Some portions of a data stream are treated as commands, like the "1" in a long-distance dialing sequence. Other portions are treated as data, like the telephone number. How a portion of the data stream is treated can vary with its position within the data stream. Depending on the protocol used, the treatment of a portion of a data stream can also vary with the position of that portion with respect to characters or character sequences in the data stream that function as order representing buffer control information. The general operation of several types of such order (e.g., start-field orders, set-attribute orders, set-buffer-address orders) are discussed below.

Addressing Buffer Memory

The command sets available in communications protocols typically include commands for specifying where outgoing data from the host computer should be placed in the device buffer when received by the device. This is known as specifying the buffer address at which the new data should be written into the buffer.

In the example represented in FIGS. 1 and 2, an outgoing data stream from the host computer might include a command for the terminal device to prepare to write new data into the display buffer beginning at buffer address 8. The outgoing data associated with this command might then consist of the characters "n o t". The terminal would process this command and modify the device buffer in accordance with the associated data. The display, which acts as a window on the buffer, would then read "Now is not time . . ." instead of "Now is the time . . ."

Buffer-Embedded Character Attribute Data

Some communications systems embed codes within the buffer itself that indicate to the terminal's internal software just how subsequent characters in the buffer should be presented on the display screen or printout. The IBM 3270 system is an example of such a system. In the simplified example shown in FIG. 3, the character at buffer address 1 is assumed to be a code that causes a terminal screen to display all subsequent characters (i.e., the characters stored at buffer addresses 2, 3, and so forth) extra bright on the screen. The code itself is displayed as a blank on the screen. All subsequent "real" characters are displayed extra bright until the brightness is turned off by another embedded code. In FIG. 3, a code representing "normal" display is shown at buffer address 6. The terminal causes subsequent "real" characters in the buffer (e.g., at addresses 7, 8, and so on) to be displayed on the screen at normal intensity.

In such a system, the data characters that occupy the elements of a device buffer between any two such control codes are commonly referred to as a field. The control code that occupies the buffer address immediately prior to the first character in a field is known as the field attribute character, or field attribute byte, for that field. In the simplified example of FIG. 3, the field attribute byte for the field containing the characters "N o w" is located at buffer address 1.

Techniques for controlling the field attribute byte are well known. Those skilled in the art will recognize that the IBM 3270 system, for example, utilizes known bit masking and shifting techniques to encode a number of different field attributes (brightness, etc.) into a single field attribute byte. One field attribute byte can thus control several attributes for any given field.

Premodified Fields

One of the field attributes provided for in some telecommunications systems, for example the IBM 3270 system, is known as a "modified data tag" (MDT) attribute. The MDT attribute works in conjunction with the terminal device's internal software or other control system: if the terminal notes that the MDT attribute flag for a given field is set, it includes the contents of the field in the next inbound data stream.

A host application can pre-set the MDT flag for a given field to ensure that the associated field data is transmitted inbound, whether or not it has been modified. Such a field is known as a "pre-modified" field. This technique may be useful, e.g., in a data base system where a host computer serves a number of devices, each of which is examining a particular record in a data base, by forcing each device to transmit certain portions of its buffer, e.g., the identifying number of the data base record.

Host Applications

The pre-modified field technique just discussed is an example of data streams that can be sent and received by a software program on the host computer known as an application or an applications program. A travel agent querying an airline reservation computer, for example, may have his request processed by an applications program that searches the computer's data files; identifies flights corresponding to the travel agent's request; and causes the host computer's communications device to send a data stream back to the travel agent's remote terminal. A simplified representation of this process is shown in FIG. 4.

Outgoing Transmissions

Some methods of managing outgoing data transmissions used by applications programs can result in unnecessary transmission and ineffective use of telecommunications resources. In some systems, for each outgoing transmission the host application might cause the entire terminal device buffer to be erased with a data-stream erase command conforming to the protocol in question, then to be completely refreshed with outgoing data. To the extent that the refreshed buffer is unchanged from the original buffer, the outgoing data represents wasted transmission time.

Many applications involve data fields that remain unchanged throughout an online session. In an insurance claim-adjustment application, the name and address of the insured might be such a field; on the other hand, details concerning payment of a claim might change several times during an online session.

Some screen-management systems keep track of which fields have been modified since the previous outgoing transmission and send data streams causing only the modified fields to be refreshed. This task is complicated, however, by the fact that the beginning and ending points of fields in the device buffer may be altered as a result of a data transmission. Once again, moreover, to the extent that the device buffer remains unchanged after a data transmission, the transmission represents a waste of system resources.

Incoming Transmissions

The same inefficient use of system resources can be seen in some systems for managing inbound data transmissions. As noted above, some host applications cause pre-modified attributes for each device served to be set. The entire contents of the affected fields are thus included in each inbound transmission, regardless of whether the affected fields have been modified. While this can help reduce the risk of data base corruption, it also increases the time needed for the transmission.

Transmission Speed Limitations

Minimizing the use of transmission resources is important because the effectiveness of any communications system such as described above will be subject to limitation by the rate at which data can be transmitted. Many common systems that transmit data streams over normal telephone lines, for example, cannot handle data speeds faster than 9600 bits per second (bps) or even as low as 1200 bps.

Special dedicated telephone lines can be used to increase the possible transmission speed. Nevertheless, the data speed, sometimes known as the "baud rate," can cause data to take undesirably long to transmit.

Queue Delays Arising from Slow Speeds

The waste of telecommunications resources referred to above, arising from unnecessary transmission of unmodified data, can drastically impair system effectiveness in a multi-user system. If an airline reservation computer is equipped to handle, say, 100 remote terminals at once, the time required to transmit data increases the system access time required by any single user. This can in turn increase the changes that a subsequent caller will be unable to access the system at all because the system is already busy servicing previously s ent messages. The subsequent caller will thus be forced to wait in a "queue" to be able to transmit his request or to receive the information desired.

SUMMARY OF THE INVENTION

In accordance with the present invention, an optimizer system is interposed between a host computer application program and a telecommunications link connecting the host computer with an addressable-buffer terminal device such as a screen-display terminal, a printer, or other apparatus.

The optimizer includes a computer program that remains resident in the host computer's memory. The program causes the computer (a) to divert outgoing data streams that would normally be transmitted to the device by the host; (b) to generate new optimized outgoing data streams conforming to the communications protocol in use; and (c) to hand back each optimized data stream back for further outgoing transmission in place of the corresponding original data stream.

Each incoming data stream reflects only the contents of the fields in the device buffer that have actually beed modified. If the host has previously instructed the device to transmit all fields, however, whether or not modified, the host might attempt to retransmit the instruction or even take improper action. To prevent this, the optimizer creates a new incoming data stream conforming to the host's previously-noted expectations about the incoming data stream.

The contents of an optimized outgoing data stream reflect the result of a comparison by the optimizer of (1)

an image in random-access memory (RAM) of the "updated state" of the device buffer, namely the state assumed by the host application to exist in the device buffer after reception by the device of the original outgoing data stream; with (2) a similar RAM image of the assumed present state of the device buffer. The comparison is achieved by performing an exclusive-or (XOR) operation to generate a RAM image that indicates which characters in the updated-state image reflect changes from the present-state image. In some systems, this XOR operation can be achieved by destructively superimposing the updated-state RAM image over the (no longer needed) present-state RAM image, thus eliminating the need for additional RAM for a third image.

The optimizer also removes any "erase" commands from the outgoing data stream. This preserves the device buffer contents and allows the optimized outgoing data stream to transform the buffer, and thus the display, printout, or other presentation, to the desired new state.

The optimized data stream "handed back" by the optimizer thus represents the differences between the assumed present and updated states of the device buffer. Consequently, it is normally shorter than the usual display-refreshing data stream which represents the entire updated state of the buffer, and it thus requires correspondingly less transmission time.

As part of the optimization of outgoing data streams, the optimizer negates any order in the original outgoing data stream that would cause the terminal device to transmit inbound the entirety of any portion of the device buffer regardless of whether that portion had been modified. Of course, subsequent inbound transmissions from the device would reflect the fact that its premodified field attributes had been turned off in this manner. To conform to the expectation of this application program in this regard, the optimizer additionally modifies each inbound data stream to supply any fields expected by the host application.

Control codes contained in the device buffer, such as field attribute bytes, are represented in the updated-state and present-state images by unique characters. The optimizer consults a translation table to generate these characters. The purpose of the translation is to ensure that the XOR comparison of the two images will not result in an incorrect no-change-required conclusion for a particular device buffer address if a control code in one image is identical to a data character at the same address in the other image.

The optimizer programming includes the capability to deal with null suppression in some terminal devices. The internal programming of some devices causes them to suppress nulls in transmitting inbound data. For example, a ten-character field with three nulls interspersed throughout would be transmitted to the host as seven characters. Null suppression systems typically do not incidate where the nulls were suppressed, and so it would be difficult or impossible to reconstruct the exact content of the associated field in the device buffer. Consequently, in parsing an incoming transmission, the optimizer can detect null suppression in a field by noting when the field length does not match the corresponding field length in the image generated during the previous outgoing transmission, but the optimizer cannot reliably update the present-state image of the device buffer in that field.

In such a situation a simple way of ensuring that the next outgoing transmission properly updates the null-suppressed field is to transmit the entire content of that field. When the optimizer detects null suppression in a field during an incoming transmission, it fills the associated portions of the present-state image with a unique "in-doubt" character signifying that the exact content of the null-suppressed field is not known. When the XOR comparison is performed, a mismatach occurs at those addresses, since the unique in-doubt character in the present-state image does not match any character in updated-state image. The characters from the updated-state image are therefore superimposed on the in-doubt characters by the XOR comparison and are routinely included in the next optimized outgoing data stream as described above.

BRIEF DESCRIPTION OF THE DRAWINGS

FIG. 4 is a simplified block diagram of a typical host application program as used in a telecommunication system.

FIG. 5 is a simplified block diagram of the same system with an optimizer in accordance with the present invention interposed between the application program and the host communications device.

FIGS. 6A and 6C are flow charts of the operation of the optimizer in processing an outgoing data stream.

FIG. 6B is a block diagram of one of the operations represented in FIG. 6A.

Throughout the following detailed description, similar reference numerals refer to similar elements in all Figures of the drawings.

DETAILED DESCRIPTION OF THE INVENTION

Figures 1, 2, 3:
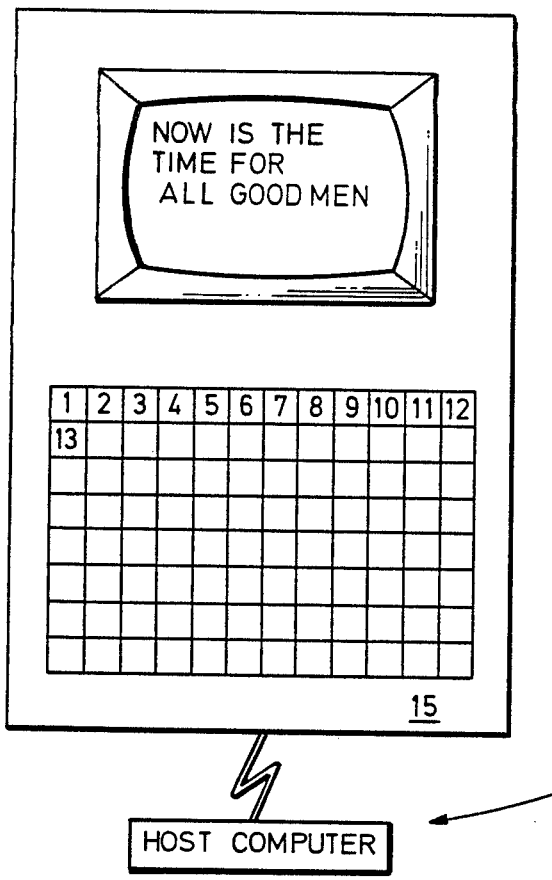
FIG. 1 is a simplified block diagram representing typical data telecommunications arrangements.
FIGS. 2 and 3 are representations of maps of the contents of a display buffer.

As shown in FIG. 5, a telecommunications system 10 includes a terminal device 15 in communication with a host computer 20. The programming of the host computer 20 includes one or more application programs 25 which exchange data streams, indicated by arrows 26 and 27, with a communications program 30. These programs 25 and 30 may be of any type appropriate to the particular host computer 20; they are not disclosed herein and are described only generally for purposes of explanation. The application programs 25 are sometimes referred to herein as host applications or host units. Similarly, the communications program 30 is sometimes referred to herein as a signal routing unit. It will be appreciated by those of ordinary skill having the benefit of this disclosure that, while the host unit, the signal routing unit, and the optimizer described below are described herein as being implemented on a single computer, the invention disclosed and claimed herein is not limited to such implementations.

Data streams to and from the host application 25 are intercepted by an optimizer program 35 in accordance with the present invention. As shown in FIG. 5, the optimizer program 35 is interposed between the host application program 25 and the communications program 30. The optimizer 35 pre-processes outgoing data streams to the device 15 before the data streams are actually transmitted by the communications program 30. The optimizer 35 additionally pre-processes incoming data streams received by the communications program 30 before the data streams are delivered to the host application 25.

Figure 6C:
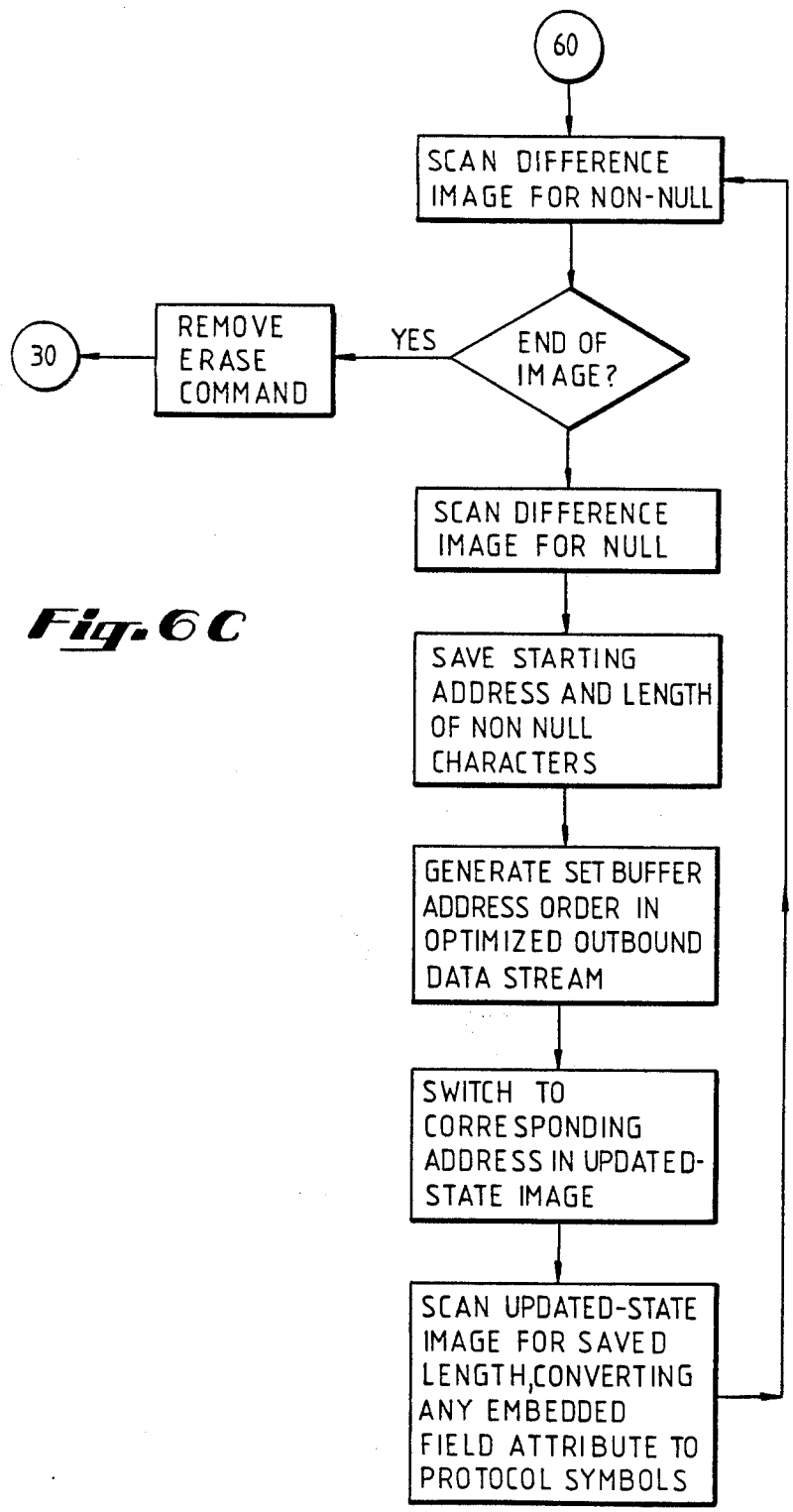
Figure 7:
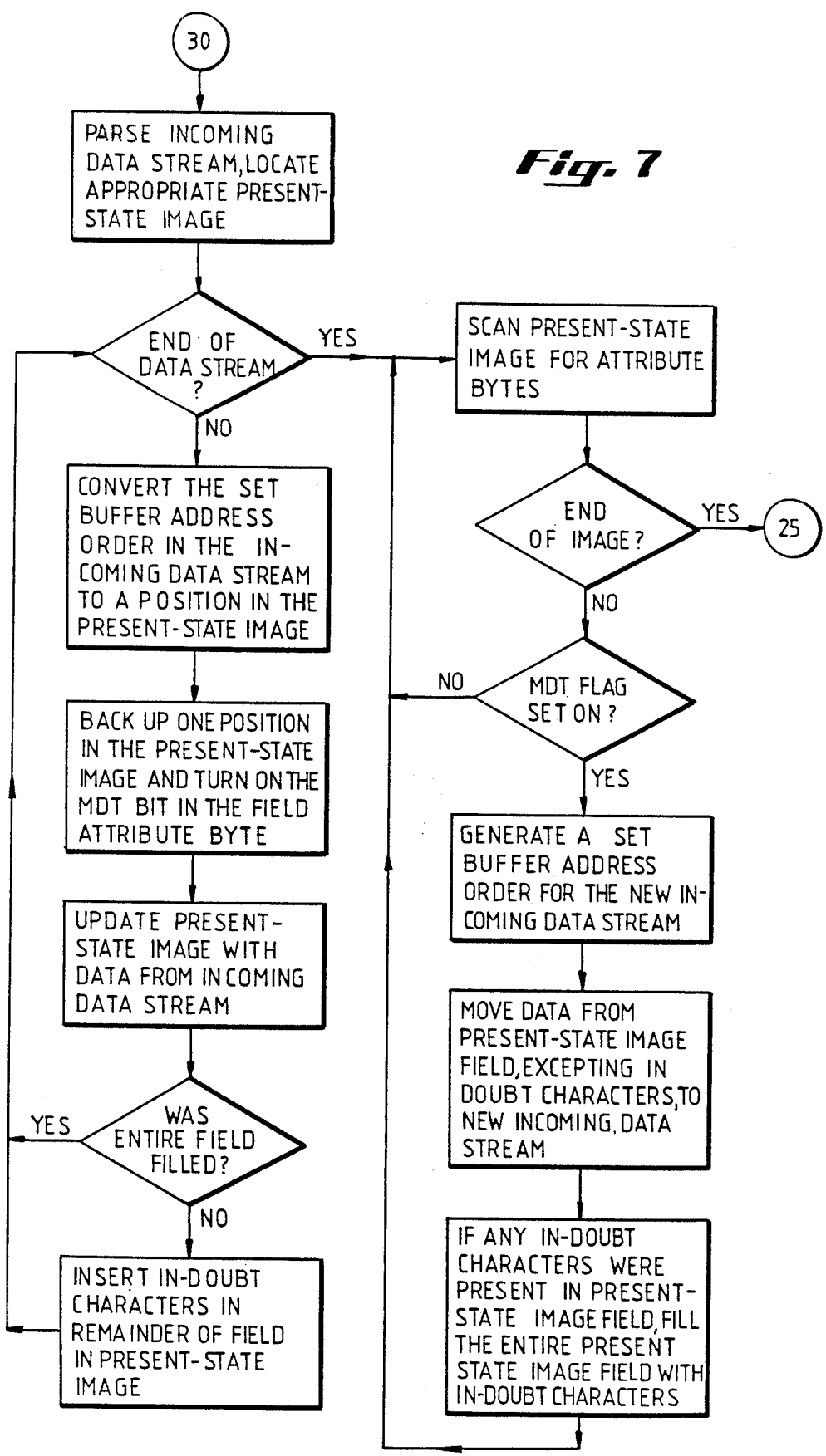
FIG. 7 is a flow chart of the operation of the optimizer in processing an incoming data stream.

As will be appreciated by those skilled in the art, the details of the optimizer program 35 will of course vary with such things as the design of the host computer 20 upon which the optimizer program 35 is implemented, the operating system program used for the host computer 20, the communications protocol in use, and so forth. FIGS. 6A and 6C show the general sequence of operations of an optimizer in accordance with the present invention in processing an outgoing data stream, and FIG. 7 shows the corresponding general sequence in processing an incoming data stream.

The optimizer 35 remains resident in the memory of the host computer 20. Using techniques known to those skilled in the art, when the host application 25 initiates a call to the communications program 30 in the case of an outgoing data stream, or vice versa in the case of an incoming data stream, the call is stolen by the optimizer 35, in effect diverting the data stream for preprocessing.

General Sequence for Outgoing Data Streams

Referring to FIGS. 5 and 6A, when the host application 25 generates an outgoing data stream 26, the optimizer 35 steals the data stream 26 as described above. As shown in FIG. 6A, the optimizer 35 parses the outgoing data stream 26 to determine which device 15 is the intended destination of the data stream 26. It locates the RAM image of the present state of the selected device 15, or if none exists (such as in a log-in or sign-on situation), creates one. It makes a copy of this present-state image; an updated-state image discussed below will be based upon the copy.

It should be noted that the term "present state" of the device buffer refers to the state which is assumed to exist by the host application 25. As is seen below, the actual state of the device buffer differs from this assumed state because of the operation of the optimizer 35.

The optimizer 35 parses the outgoing data stream 26 in the same general manner as is done by the device 15 when a protocol data stream is received. If any portion of the data stream 26 represents a control code, e.g., a field attribute, in the protocol in question, that portion is translated into a unique character to avoid any possible confusion with data characters. The optimizer 35 applies the parsed data stream, including any translated portions, to the copy of the RAM image in a simulation of the action of the device 15 upon the device buffer. The copy thus becomes an updated-state image of the device buffer that represents the state of the buffer to be expected when the outgoing data stream 26 is ultimately received by the device 15.

The optimizer program 35 then destructively superimposes the updated-state RAM image upon the present-state RAM image in an exclusive-or (XOR) operation indicated in FIGS. 6A and 6B by the reference numeral 50. The present-state image is thereby transformed into a pattern of binary zeros or nulls (where the present- and updated-state images were identical) and non-nulls (where they differed), referred to herein as the "difference image."

The address of any non-null character found in the difference image, by the action of the XOR operation, corresponds to the address of a character in the updated-state image required to update the corresponding position in the buffer of the device 15, referred to as an "updating character."

Referring now to FIG. 6C, the optimizer 35 begins constructing an optimized data stream to be transmitted to the device 15. The optimizer 35 scans the difference image in search of non-null characters. When a non-null character is encountered, the optimizer 35 notes its address and adds a set-buffer-address order, corresponding to that address, to the optimized data stream.

The optimizer 35 then switches to scanning the difference image in search of a null character. When a null character is encountered, the optimizer 35 notes its address as well.

The optimizer 35 returns to the updated-state image with the starting and ending addresses of a sequence of updating characters, which correspond to the starting and ending addresses of the previously referred-to non-null character sequence in the difference image. Each such updating character in the updated-state image is examined to determine if it is an encoded control character such as a field attribute byte. If so, the character is decoded in a translation table and an appropriate control order is added to the optimized data stream. If the updating character is a data character instead of a control character, the optimizer 35 adds the character to the optimized data stream.

When all updating characters in the sequence have been processed in this manner, the optimizer 35 returns to scanning the difference image again for non-null characters. The above steps are repeated until the entire difference image has been processed. The resulting new data stream reflects only the updating characters instead of the entire contents of the updated-state image.

Some systems 10 may provide for sending an "erase" code to the device 15 independent of the contents of the outgoing data stream 26. In such systems, the optimizer 35 is programmed to remove the erase code.

The new optimized outgoing data stream is handed to the communications program 30 for transmission to the device 15. The updated-state image is retained for use as the new present-state image.

General Sequence for Incoming Data Streams

FIG. 7 shows the general sequence of program instructions for the optimizer 35 for handling incoming data streams.

Using techniques similar to those described above, the optimizer 35 intercepts incoming data streams from the communications program 30. The optimizer 35 parses each incoming data stream to determine which device 15 originated the data stream. The present-state image for that particular device (i.e., the image of the state assumed to exist by the host application 25) is located.

The optimizer's next task is to update the present-state image with the incoming data. Incoming data streams in some systems consist of the contents of a series of data fields, each preceded by the address in the device buffer of the first data (as opposed to control) character in the field because the embedded control code delimiting the beginning of the field (e.g., the field attribute byte) is not included in the data stream.

In such a situation the optimizer 35 finds the corresponding address in the present-state image, namely the address of the first data (as opposed to control) character in that particular field. The optimizer backs up one character in the present-state image, namely to the address of the control character that marks the beginning of the field. It decodes that control character (which is represented in the present-state image by a unique symbol), turns on the MDT flag to indicate that the data in that field have been modified, and re-encodes the control code into the corresponding unique symbol. (In some cases the MDT flag will already be set because the present-state image reflects the host application 25's assumptions about the state of the device buffer, and those assumptions may include the pre-setting of the MDT flag for the field in question.)

The data from the incoming data stream, reflecting the contents of modified fields in the device buffer, are then copied into the succeeding positions in the present-state image. Failure to fill a field in the present-state image completely with incoming data indicates that the terminal device 15 suppressed nulls in the field during transmission. In such event, the image field is filled out with a unique "in-doubt" character to indicate the suppression of nulls.

Each succeeding portion of the incoming data stream, i.e., each modified-field transmission from the device 15, is parsed and added to the present-state image in the same way until the entire data stream has been parsed.

The original incoming data stream is then discarded and the optimizer 35 begins constructing a new incoming data stream to hand back to the host application 25. The optimizer 35 scans the present-state image for the unique symbols indicating control characters such as field attribute bytes.

Each such control character is decoded and examined to determine whether the host application 25 should treat the corresponding data field as having been modified. This will occur either if the corresponding field at the device buffer was actually modified, in which case the new data was received and processed as just described and the MDT flag was turned on by the optimizer 35; or if the host application 25 assumes that the MDT flag for that field was pre-set to begin with.

In either case, a set-buffer-address order corresponding to the address of the field in question is added to the new incoming data stream, followed by the data characters in that field in the present-state image (but not by any trailing in-doubt characters). If the present-state image field contains any trailing in-doubt characters, the entire field is filled with the in-doubt character to ensure that the entire field will cause a mismatch on the next outgoing XOR comparison (FIGS. 6A and 6B) and therefore be transmitted back to the device 15.

When the entire present-state image has been processed in this way, the new data stream, which simulates an unoptimized incoming data stream, is handed to the host application 25.

It will be appreciated by those skilled in the art having the benefit of this disclosure that this invention is believed to be capable of application in other situations. Accordingly, this description is to be construed as illustrative only and as for the purpose of teaching those skilled in the art the manner of carrying out the invention.

It is also to be understood that the form of the invention shown and described is to be taken as the presently preferred embodiment. Various modifications and changes may be made without departing from the spirit and scope of the invention as set forth below in the claims.

For example, the computer could be programmed to perform its imaging comparison on specified portions of the updated- and present-state buffer images instead of on the images as a whole. This might prove useful in situations where the contents of some portions of the remote device buffer are known to be fixed and not subject to modification either by the host or by the device, e.g., where unchanging information is displayed on a terminal screen to prompt the terminal user.

The optimizer can also be used in conjunction with local devices such as those "hard-wired" into the host as well as with remote devices connected to the host by telephone.

A similar imaging technique can be used if the device uses additional buffers to contain other control characters such as character attributes or extended field attributes. The imaging concept can also be extended to devices that support partitioning of a display screen by creating present- and updated-state images for each partition. This could be accomplished, for example, by partitioning the RAM images discussed above. The imaging technique can be adapted for use with programmed symbol buffers for graphics users, for implementing outboard formatting applications, or to handle devices that utilize light pens or magnetic-strip readers attached.

It is intended that the following claims be interpreted to embrace all such modifications and changes.

What is claimed is:

1. An optimizing system for a telecommunications system that includes
    a host unit which exchanges data streams with a peripheral device, said data streams being routed between said host unit and said peripheral device by a signal routing unit,
    said peripheral device having an addressable buffer whose information contents are modifiable in response to data streams from said host unit,
    said buffer contents including data characters and further including control codes,
said optimizing system comprising:
    an optimizer connected to control said signal routing unit and programmed
    to read the information content of a data stream from the host unit prior to the routing of the data stream to the peripheral device;
    to generate an updated-state image representing the information contents of the peripheral device buffer that would be expected to exist after processing by the peripheral device of said data stream;
    to generate a data stream representing any differences in data characters, as well as any differences in control codes, between said updated-state image and a present-state image representing the information available to the optimizer about the present information contents of the peripheral device buffer; and
    to cause said signal routing unit to route the data stream so generated to the peripheral device in lieu of the data stream from the host unit.

2. The optimizing system of claim 1, wherein said optimizer is programmed
    to translate any control code, normally represented in a data stream by an original symbol that is also usable to represent a data character, into a translated symbol that is not used to represent any data character;
    to utilize said translated symbol in generating the updated-state image and the present-state image; and to retranslate any translated symbol so that any control code contained in the data stream routed to the peripheral device is represented by its corresponding original symbol.

3. The optimizing system of claim 1, wherein said optimizer is programmed so that all premodified field flags in the data stream routed to the peripheral device are turned off.

4. An optimizing system for a telecommunications system, said telecommunications system including a host unit which exchanges data streams with a peripheral device, said data streams being routed between said host unit and said peripheral device by a signal routing unit, said peripheral device having an addressable buffer whose information contents are modifiable in response to data streams from said host unit, said buffer contents including data characters and further including control codes, said optimizing system comprising:

a control-code translation table stored in a storage device and containing, for each control code normally represented in a data stream by an original symbol that is also usable to represent a data character, a translated symbol that is not used to represent any data character;

an optimizer connected to control said signal routing unit and to read said translation table and programmed to read the content of an original data stream emanating from the host prior to the routing of the original data stream to the peripheral device;

to generate an updated-state image, said updated-state image representing the information contents of the buffer that would be expected to exist after processing by the peripheral device of said original data stream, said optimizer utilizing in said updated-state image generation the translated symbol for any control code having a translated symbol instead of the corresponding original symbol for said control code;

to generate a modified data stream, said modified data stream representing any differences in data characters, as well as any differences in control codes, between said updated-state image and a present-state image representing the information available to the optimizer about the present information contents of the peripheral device buffer, the optimizer utilizing in said modified data stream generation the original symbol for any control code having a translated symbol; and to cause said signal routing unit to route the modified data stream to the peripheral device in lieu of the original data stream from the host unit.

5. The optimizing system of claim 4, wherein said optimizer is programmed to incorporate a device-control message in the modified data stream that, when processed by the peripheral device, causes a data stream subsequently initiated by the peripheral device to be sent as a data stream representing changes to the peripheral device buffer that were caused at the device since the last data stream initiated by the peripheral device.

6. A method for optimizing the exchange of data streams between a host unit and a peripheral device, said data streams being routed between the host unit and the peripheral device by a signal routing unit, said peripheral device having an addressable buffer whose information contents are modifiable in response to data streams from said host unit, said buffer contents including data characters and further including control codes, said method comprising the steps of:

reading the information content of a data stream from the host prior to the routing of the data stream to the device;

generating an image representing the updated state of the buffer, said updated-state being the state that would be expected to exist after processing by the peripheral device of said data stream;

generating a substitute data stream representing both any differences in data characters and any differences in control codes between said updated-state image and an image representing the information available to the optimizer about the present information content of the peripheral device buffer; and sending the substitute data stream so generated to the peripheral device in lieu of the original data stream.

7. An optimizing system for a telecommunications system, said telecommunications system including a host unit which exchanges data streams with a peripheral device, said data streams being routed between the host unit and the peripheral device by a signal routing unit, said peripheral device having an addressable buffer whose information contents are modifiable in response to data streams from said host unit, said buffer contents including data characters and further including control codes, said optimizing system comprising:

a control-code translation table, said translation table containing, for each control code normally represented in a data stream by an original symbol that is also usable to represent a data character, a translated symbol that is not used to represent any data character;

an optimizer connected to control said signal routing unit and to read said translation table and programmed to read the content of an original data stream emanating from the host unit prior to the routing of the data stream to the peripheral device;

to generate an updated-state image, said updated-state image representing the information contents of the buffer that would be expected to exist after processing by the peripheral device of said data stream, said optimizer utilizing in said updated-state image generation the translated symbol for any control code having a translated symbol instead of the corresponding original symbol for that control code;

to generate a modified data stream;

said modified data stream representing any differences in data characters, as well as any differences in control codes, between said updated-state image and a present-state image representing the information available to the optimizer about the present information content of the peripheral device buffer, the computer utilizing in said modified data stream generation the original symbol for any control code having a translated symbol instead of the corresponding translated symbol;

to cause said signal routing unit to route the modified data stream to the peripheral device in lieu of the original data stream from the host unit;

to read an incoming data stream from said peripheral device; and to update said present-state image to reflect changes signified by said incoming data stream.

8. A method for optimizing the exchange of data streams between a host unit and a peripheral device, said data streams being routed between the peripheral device and the host unit by a signal routing unit, said peripheral device having an addressable buffer whose contents are modified in response to data streams from said host unit, said buffer contents including data characters and further including control codes, said method comprising the steps of:

reading the content of a data stream from the host unit prior to the routing of the data stream to the peripheral device;

generating an image representing the updated state of the buffer, said updated state being the state that would be expected to exist after processing by the peripheral device of said data stream;

generating a substitute data stream representing both any differences in data characters and any differences in control codes between said updated-state image and an image representing the information available to the optimizer about the present information content of the peripheral device buffer;

sending the data stream so generated to the peripheral device in lieu of the original data stream;

reading an incoming data stream from said peripheral device; and updating said present-state image to reflect changes signified by said incoming data stream.

9. A modified data stream for transmission in a telecommunications system, said system including:

a host unit which exchanges data streams with a peripheral device, said data streams being routed between the host unit and the peripheral device by a signal routing unit, said peripheral device having an addressable buffer whose contents are modifiable in response to data streams from the host unit, said buffer contents including data characters and further including control codes, said modified data stream produced by a process comprising the steps of:

reading the information content of a data stream from the host unit prior to the transmission of the data stream to the peripheral device;

generating an image representing the updated state of the buffer, said updated state being the state that would be expected to exist after processing by the peripheral device of said data stream; and generating a modified data stream representing both any differences in data characters and any differences in control codes between (a) said updated-state image and (b) an image representing information known about the present information content of the peripheral device buffer.

10. The modified data stream of claim 9 wherein said step of reading the information content of a data stream from the host unit prior to the transmission of the data stream to the peripheral device is performed by a programmed computer.

11. The modified data stream of claim 9 wherein said step of generating an image representing the updated state of the buffer is performed by a programmable computer.

12. The modified data stream of claim 9 wherein said step of generating a modified data stream representing both any differences in data characters and any differences in control codes between (a) said updated-state image and (b) an image representing information known about the present information content of the peripheral device buffer, is performed by a programmed computer.

13. The modified data stream of claim 9 wherein said modified data stream is sent to the peripheral device in lieu of the data stream from the host unit.

* * * * *